US010766006B2

(12) United States Patent
Mussari et al.

(10) Patent No.: US 10,766,006 B2
(45) Date of Patent: Sep. 8, 2020

(54) ELECTROKINETIC THICKENING AND DEWATERING METHOD AND SYSTEM

(71) Applicant: BCR ENVIRONMENTAL CORPORATION, Jacksonville, FL (US)

(72) Inventors: Frederick P. Mussari, Melbourne, FL (US); Michael Phillip Norris, Jacksonville, FL (US)

(73) Assignee: BCR ENVIRONMENTAL CORPORATION, Jacksonville, FL (US)

( * ) Notice: Subject to any disclaimer, the term of this patent is extended or adjusted under 35 U.S.C. 154(b) by 180 days.

(21) Appl. No.: 15/778,792

(22) PCT Filed: Nov. 22, 2016

(86) PCT No.: PCT/US2016/063356
§ 371 (c)(1),
(2) Date: May 24, 2018

(87) PCT Pub. No.: WO2017/091587
PCT Pub. Date: Jun. 1, 2017

(65) Prior Publication Data
US 2018/0345222 A1  Dec. 6, 2018

Related U.S. Application Data

(60) Provisional application No. 62/259,675, filed on Nov. 25, 2015.

(51) Int. Cl.
B01D 61/56 (2006.01)
B01D 61/42 (2006.01)
(Continued)

(52) U.S. Cl.
CPC ........... *B01D 61/56* (2013.01); *B01D 61/427* (2013.01); *C02F 1/4674* (2013.01);
(Continued)

(58) Field of Classification Search
CPC ...... B01D 61/00; B01D 61/42; B01D 61/427; B01D 61/56; C02F 1/00; C02F 1/46;
(Continued)

(56) References Cited

U.S. PATENT DOCUMENTS 5,861,090 A    1/1999 Clarke et al.
2010/0078389 A1  4/2010 Elektorowicz et al.
(Continued)

FOREIGN PATENT DOCUMENTS

CN  103060836 A   4/2013
WO  2011090376 A1  7/2011

OTHER PUBLICATIONS

International Search Report and Written Opinion from corresponding International Application No. PCT/US2016/063356 dated Mar. 27, 2017.

*Primary Examiner* — Natasha E Young
(74) *Attorney, Agent, or Firm* — Lando & Anastasi, LLP

(57) ABSTRACT

A method and device for using electrokinetic forces for thickening or dewatering municipal biosolids is provided. The method uses chlorine dioxide to accelerate and improve the efficiency of electrokinetic dewatering.

13 Claims, 2 Drawing Sheets

(51) Int. Cl.
*B01D 61/00* (2006.01)
*C02F 1/46* (2006.01)
*C02F 1/76* (2006.01)
*C02F 11/00* (2006.01)
*C02F 11/12* (2019.01)
*C02F 1/469* (2006.01)
*C02F 1/467* (2006.01)

(52) U.S. Cl.
CPC .............. *C02F 1/4698* (2013.01); *C02F 1/76* (2013.01); *C02F 11/006* (2013.01); *C02F 11/12* (2013.01)

(58) Field of Classification Search
CPC ........ C02F 1/461; C02F 1/467; C02F 1/4672; C02F 1/4674; C02F 1/469; C02F 1/4698; C02F 1/72; C02F 1/76; C02F 11/00; C02F 11/006; C02F 11/12
See application file for complete search history.

(56) References Cited

U.S. PATENT DOCUMENTS

| | | | |
|---|---|---|---|
| 2012/0225135 A1 | 9/2012 | Krogulec | |
| 2013/0134092 A1* | 5/2013 | Mussari | C02F 9/00 |
| | | | 210/620 |
| 2014/0073774 A1* | 3/2014 | Heiskanen | C02F 11/006 |
| | | | 536/56 |

\* cited by examiner

ELECTROKINETIC THICKENING AND
DEWATERING METHOD AND SYSTEM

CROSS-REFERENCE TO RELATED
APPLICATIONS

This application is a U.S. National Phase Application under 35 U.S.C. § 371 of International PCT Application Serial No. PCT/US2016/063356, now WO 2017/063356, titled ELECTROKINETIC THICKENING AND DEWATERING METHOD AND SYSTEM, and filed Nov. 22, 2016, which claims the benefit under 35 U.S.C. § 119 of U.S. Provisional Patent Application Ser. No. 62/259,675, titled ELECTROKINETIC THICKENING AND DEWATERING METHOD AND SYSTEM, and filed Nov. 25, 2015, each of which is hereby incorporated herein by reference in its entirety for all purposes.

FIELD OF THE TECHNOLOGY

Enhanced drying of wastewater residuals, for example, sludge or biosolids are provided through oxidation and electrokinetic processes. More specifically, enhanced drying may be performed through chlorine dioxide treatment and electro-osmosis.

SUMMARY

In accordance with one or more aspects, a method for separating water from biosolids may comprise treating a sludge or biosolids with chlorine dioxide to form a pretreated biosolids, and subjecting the pretreated biosolids to electro-osmosis to separate water from the pretreated biosolids.

In some embodiments, treating a sludge or biosolids with chlorine dioxide to form a pretreated biosolids results in a Class B pretreated biosolids.

In accordance with one or more aspects, an electrokinetic dewatering or thickening device may comprise an upper portion, including an inlet to receive pretreated biosolids, and a conduit extending from the inlet. The electrokinetic dewatering or thickening device may also comprise a lower portion positioned below the upper portion, the lower portion including a first electrode compartment having a first electrode surrounded by filter material, the first electrode and filter material defining a first filtrate drain space, and a second electrode compartment having a second electrode distal to the filter material, the second electrode and filter material defining a second filtrate drain space, the second electrode compartment spaced apart from and surrounding the first compartment. The electrokinetic dewatering or thickening device may further comprise a dewatered or thickened pretreated biosolids outlet positioned below the lower portion, and a filtrate outlet fluidly connected to at least one of the first drain space and the second drain space.

In some embodiments, the electrokinetic dewatering or thickening device further comprises an outer wall connected to at least one of the first electrode and the second electrode. In some embodiments, the outer wall is made of a non-conductive material. In some embodiments, the outer wall is made of PVC.

In some embodiments, the first electrode and the second electrode are made of graphite, conductive carbon fiber, or a combination of both.

In some embodiments, the electrokinetic dewatering or thickening device further comprises a power supply connected to the first electrode and the second electrode.

In accordance with one or more aspects, a waste treatment system comprises a source of municipal sludge or biosolids, and a chlorine dioxide treatment unit fluidly connected to and downstream of the source of municipal sludge or biosolids and configured to produce pretreated biosolids from the municipal sludge. The waste treatment system also comprises the electrokinetic dewatering or thickening device, positioned downstream of the chlorine dioxide treatment unit. The electrokinetic dewatering or thickening device may comprise first and second electrode compartments, and a dewatered or thickened pretreated biosolids outlet positioned below the first and second electrode compartments.

In some embodiments, the electrokinetic dewatering or thickening device may further comprise an inlet to receive the pretreated biosolids.

In some embodiments, the electrokinetic dewatering or thickening device may further comprise a filtrate outlet connected to at least one of the first drain space and the second drain space.

In some embodiments, the first electrode compartment comprises a first electrode surrounded by a filter material. In some embodiments, the first electrode and the filter material define a first filtrate drain space.

In some embodiments, the second electrode compartment comprises a second electrode distal to the filter material. In some embodiments, the second electrode and the filter material define a second filtrate drain space. In some embodiments, the second electrode compartment is spaced apart from the first electrode compartment.

In some embodiments, the electrokinetic dewatering or thickening device further comprises a filtrate outlet connected to at least one of the first drain space and the second drain space.

Still other aspects, embodiments, and advantages of these exemplary aspects and embodiments are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment," or the like are not necessarily mutually exclusive and are intended to indicate that a particular feature, structure, or characteristic described in accordance with the embodiment may be included in at least one embodiment. The appearances of such terms herein are not necessarily all referring to the same embodiment.

BRIEF DESCRIPTION OF THE DRAWINGS

Certain illustrative features and examples are described below with reference to the accompanying figures in which.

Figure 1:
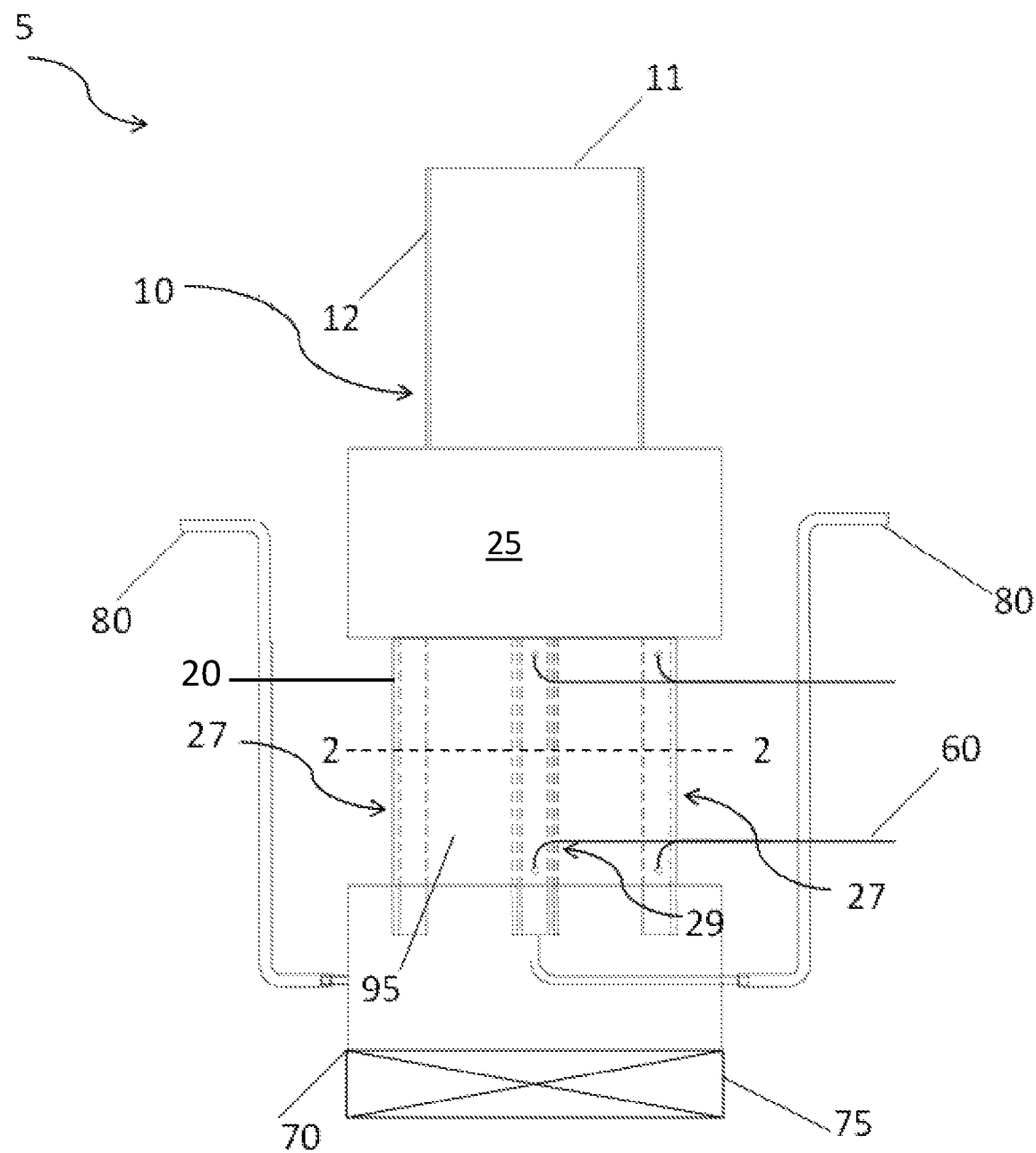
FIG. 1 shows a plan view of an embodiment of the dewatering or thickening device.

It will be recognized by the person of ordinary skill in the art, given the benefit of this disclosure, that the dimensions, size, components, and views shown in the figures are for illustrative purposes. Other dimensions, representations, features, and components may also be included in the embodiments disclosed herein without departing from the scope of the description.

DETAILED DESCRIPTION

This disclosure relates to a method and system, including a device, for electrokinetic dewatering of municipal biosolids. In particular, the invention relates to methods of using chlorine dioxide to modify the characteristics of municipal biosolids to enhance the conductivity of the material and increase the electro-osmotic flow and to provide a mechanical mechanism to provide for the removal of water for the purpose of thickening or dewatering which enables plug-flow, or continuous operation.

Wastewater treatment is generally a multi-stage process. An early stage of municipal wastewater treatment is the removal of nutrients from the wastewater. This removal is typically accomplished by a biological process, in which a biological sludge is produced by the buildup of cell mass. Once treated to reduce pathogens or stabilize the material, this biological sludge is referred to as biosolids. Municipal biosolids may be thickened or dewatered to reduce water volume prior to final disposal. The term "thickened" is generally used to denote a reduction in water content of the sludge or biosolids. The term "dewatered" is generally used to denote a reduction in water content greater than that achieved by "thickening." There may, however, be some overlap in the range of percentages of water content in biosolids that are referred to as thickened or dewatered. Thickening generally refers to a process in which the liquid fraction of the sludge or biosolids is reduced and the solids fraction is increased to up to 15%, while dewatering generally refers to a process in which the solids fraction is increased to 15% or greater.

Dewatered biosolids may be used as fertilizer or soil amendment. Biosolids are sometimes not beneficially reused and are disposed of in sanitary landfills. Since biosolids do contain nitrogen, phosphorus and other nutrients that have value as a fertilizer, and also have potential value as a fuel, there is a need to dewater the treated biosolids prior to final disposition in order to reduce the cost of transportation, concentrate the nutrient value, and reduce the amount of energy required to utilize the material as a fuel.

Typical mechanical dewatering methods require the addition of polymer to facilitate dewatering and produce a dewatered material that is usually in the range of 16-25% total solids. Polymer addition can account for roughly 30% of the cost of biosolids treatment and disposal. Examples of dewatering devices are belt presses, screw presses and centrifuges. Other dewatering devices, such as plate and frame presses are capable of removing more water from biosolids, but often have a lower throughput, or processing capacity.

One of the major disadvantages of conventional mechanical dewatering techniques is that the rate of water removal depends on the hydraulic permeability of the sludge. As the sludge becomes compressed, the porosity decreases and rate of dewatering decreases.

Electrokinetic dewatering has traditionally been thought to be not well-suited to use with municipal biosolids due in part to the low conductivity of the material.

There are four types of water in municipal biosolids. The first type of water is free water, which is not bound to the particles. Free water represents the largest portion of water (70-75%) in biosolids. The second type of water is interstitial or capillary water, which is bound by capillary forces between the sludge floc or trapped in interstitial spaces. Another type of water is surface or vicinal water that is held tightly to the solids particle surface by hydrogen bonding. Finally, intracellular water is chemically bound water within the particle structure.

Traditional (mechanical) dewatering methods require the addition of polymer to remove primarily free water and some interstitial water. Electrokinetic dewatering requires no polymer addition and induces an electrical field through sludge, causing an electro-osmotic phenomenon. The mechanism of electro-osmotic dewatering is primarily based on the interaction between the applied electric field and the electric charge density of ions existing in the liquid close to the surface of the sludge particles.

According to one embodiment of the present disclosure, a method is provided to modify the characteristics of the liquid biosolids that facilitates electrokinetic dewatering. The method may comprise treating a sludge with chlorine dioxide to form a pretreated biosolids; and subjecting the pretreated biosolids to electro-osmosis to separate water from the pretreated biosolids. A device is provided to practice this method which allows for continuous (plug flow) operation for either thickening or dewatering of this material. This method allows for enhancement of removal of free water in addition to interstitial and vicinal water in the biosolids. The method is assisted by pressure which can be provided by static head or a low-pressure pump.

According to one embodiment of the present disclosure, an electrokinetic dewatering or thickening device is provided. The device may comprise an upper portion and a lower portion. The upper portion may include an inlet to receive pretreated biosolids and a conduit extending from the inlet. The upper portion may provide a static pressure head. The lower portion may be positioned below the upper portion and may include a first electrode compartment having a first electrode surrounded by filter material, the space between the first electrode and filter material defining a first filtrate drain space. The lower portion may further include a second electrode compartment having a second electrode surrounding the second filter material, the space between the second electrode and filter material defining a second filtrate drain space. The second electrode compartment may be spaced apart from, and surround the first compartment. The device may further comprise a dewatered or thickened pretreated biosolids outlet positioned below the lower portion, and a filtrate outlet fluidly connected to the first drain space and the second drain space.

According to one embodiment of the present disclosure, a system for thickening or dewatering municipal biosolids is provided which includes the use of chlorine dioxide to modify the characteristics of the material to facilitate electro-osmosis and a device is provided to conduct the process. The waste treatment system may comprise a source of municipal sludge or biosolids, a chlorine dioxide treatment unit fluidly connected to and downstream of the source of municipal sludge and configured to produce pretreated biosolids from the municipal sludge; and the electrokinetic dewatering or thickening device described above, positioned downstream of the chlorine dioxide treatment unit.

The disclosed method, device, and system offer superior performance and have extremely low capital, maintenance and operating costs, providing a continuous thickening or dewatering process.

Without limiting the scope of this disclosure to a particular physical or chemical theory, the use of chlorine dioxide to enhance electrokinetic thickening or dewatering works by two primary mechanisms: 1) by causing flocculation of the biosolids to allow for enhanced settling and the separation of free water from the solids initially; and 2) by modifying the characteristics of the biosolids to facilitate electro-osmosis. Testing conducted at pilot-scale has demonstrated conductivity of secondary sludge as high at 490 $\mu S\ cm^{-1}$ at dose rates typical for disinfection of secondary sludge to Class B pathogen reduction standards.

This method presents several significant advantages over current methods, including without limitation:
1. Preservation of organic material and BTU value—undigested secondary sewage sludge has a high organic matter content ranging from 60 to 80%. After biological stabilization (digestion) the organic matter content is significantly reduced (for example, organic content is 60-70% of DS after aerobic digestion, 40-50% of DS after anaerobic digestion). Digestion reduces the calorific value of sludge from about 17.5 MJ/kg DS for raw sludge to about 10.5 MJ/kg DS for digested sludge;
2. Disinfection of secondary sludge to Class B (EPA) standards; and
3. Reduced odor which facilitates materials handling.

The present method avoids the limitations of typical mechanical dewatering methods, which exert forces on the flocked sludge particles that exceed their binding capacities, and therefore require extremely high doses of polymer to dewater or thicken to acceptable levels.

Other chemical oxidation techniques such as ozone, $O_2$ (wet oxidation) and hydrogen peroxide/ferrous ions (classic Fenton oxidation) have negative effects. For example, ozone has a negative effect on sludge dewaterability. Proteins released by cell lysis have a negative effect on sludge dewatering and the unsettled micro-particles may have an influence on sludge filtration leading to a more compact filtration layer with reduced permeation of liquids. The dewaterability of treated sludge decreases with an increase in ozone dose. Thus a higher polymer dose is required for sludge flocculation. This is not the case with chlorine dioxide.

The mechanical device disclosed provides for the continuous thickening or dewatering of liquid biosolids by creating conditions in which water (filtrate) is continuously removed from the device. The primary mechanism of water removal is simple separation of free water from the partially flocculated sludge in the first portion of the device. Material gradually achieves a higher total solids content as it passes through the device, and a current is passed through the biosolids to cause electro-osmosis. The filtrate provides conductance between the anode and cathode.

In a plug-flow state, the rate at which the thickened or dewatered biosolids are removed from the device determines the degree to which the biosolids are thickened or dewatered. This rate is controlled by means of an adjustable valve for the purpose of thickening. For biosolids dewatering, the biosolids in the lower portion of the device having a higher % total solids (<14%) can act as the valve, or plug to restrict the output from the device, in which case discharge from the device is regulated by the rate of filling. The device is filled continuously with chlorine dioxide treated biosolids which are added at a rate that is equal to the rate of removal of the filtrate and thickened or dewatered biosolids. The only difference between the operation of the device for thickening as opposed to dewatering is the residence time of the pre-treated sludge inside the lower portion of the device, and therefore the amount of water removed from the material.

When used either for thickening or dewatering, a column of sludge above the anode and cathode results in pressure being applied to the material to further assist in the dewatering process and increase the throughput. This column also may allow for settling and the removal of free water from the sludge and provides a consistent, low sludge loading rate which may allow for higher electrical field strength between the electrodes. This use of sludge as a static pressure head has a positive effect on increasing the total solids content of the final sludge cake by removing more water.

According to at least one embodiment, a process is provided for subjecting secondary sludge to an amount of chlorine dioxide sufficient to increase the dielectric constant of the liquid while simultaneously decreasing the viscosity of the liquid, and increasing sludge flocculation. This results in improved settling and allows for removal of both filtrate and either thickened or dewatered biosolids in a continuous process. Other embodiments are described herein.

Figure 2:
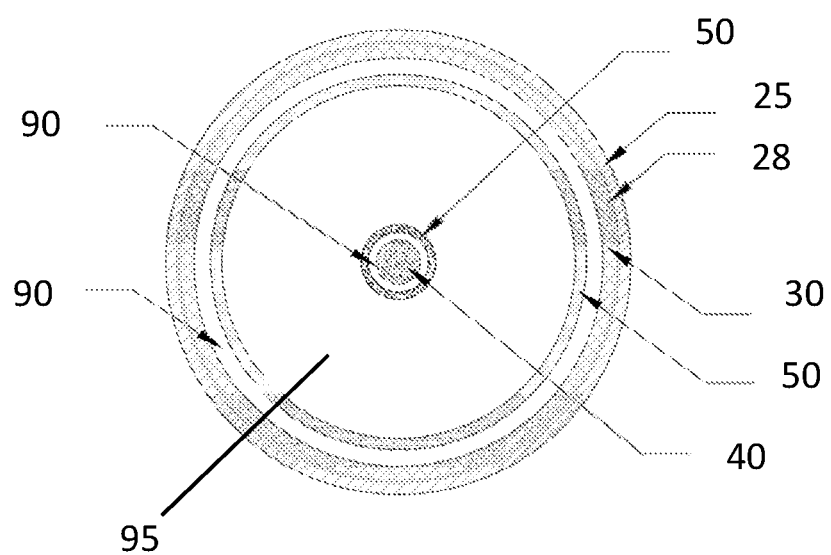
FIG. 2 shows two electrodes positioned in an electrokinetic dewatering or thickening device, taken along section line 2-2 of FIG. 1, according to one embodiment.

FIG. 1 presents a plan view of an embodiment of the dewatering or thickening device 5. FIG. 2 presents a cross-section view of the device along section line 2-2 of FIG. 1. An upper portion or head portion 10 is the upper portion of the device in which sludge is allowed to settle with free-water being removed from the sludge via the drainage space 90 provided between the textile membrane 50 and the sludge at the anode 40 and/or cathode 30. The sludge or pretreated biosolids enters through an inlet 11 and flows along a conduit or pipe 12.

A lower portion or separation portion 20 is the lower portion of the device 5 in which the thicker sludge settles. Free-water is removed in this portion of the device simply by allowing separated water to pass through the filter material around the anode and cathode, however the main mechanism of water removal in this stage of the device as progressively more water is removed is electro-osmotic flow into the space 90 between the textile membrane 50 and the sludge at the cathode 30 or anode 40.

In the embodiment shown, a cathode 30 may be an electrode composed of a graphite 'sleeve' inserted in and affixed to the outer wall 25 of the device. In some embodiments, the outer wall 25 is made of a non-conductive material. For example, in some embodiments, the outer wall 25 is comprised of PVC pipe or similar material. The pipe 25 may be connected to the cathode 30 with an epoxy or similar material 28. While the embodiment shown in FIGS. 1-2 show the cathode along the outer wall, in alternative embodiments the anode may be placed along the outer wall instead. An anode 40 may be similarly comprised of a graphite rod and positioned in the center of the lower portion according to the embodiment shown in FIGS. 1-2, but may be positioned elsewhere, alternatively. While the material used for the embodiment shown is graphite, different suitable materials, including a conductive carbon-fiber graphite impregnated rod or pipe may be used for the electrodes. The use of a PVC 'sleeve' around the second, graphite electrode not only provides strength to the cathode to prevent it from deforming under pressure, but also provides the advantage of being a low cost material with excellent conductive properties.

In some embodiments, anode 40 is the inner electrode, and cathode 30 is the outer electrode. A filter material 50 (textile membrane) is wrapped inside the cathode 30, and/or around the outside of the anode 40. A filtrate drain space 90 between the filter material 50 and the anode 40 or cathode 30 is provided to allow water to pass from the sludge into this interstitial space 90. The drain space 90 may be formed from a plastic, textile or similar mesh type material to provide structural support to the passageway without interfering with the flow of filtrate. The cathode 30, filter material 50, and filtrate drain space 90 together form a cathode compartment 27. The anode 40, filter material 50, and filtrate drain space 90 together form an anode compartment 29. In some embodiments, the cathode 30 is distal to the filter material. A connection 60 to a DC power supply (continuous or pulsed) provides power to the anode 40 and cathode 30.

The space between the cathode compartment 27 and anode compartment 29 forms a biosolids passageway 95. An outfall or outlet 70 of the device 5 is at the bottom, and may include an adjustable valve 75 if the device 5 is to be used as a thickening device, or a simple opening if the device is to be used for dewatering, in which case the sludge cake provides a "plug," preventing non-dewatered or non-thickened sludge from passing freely through the device 5. When operating to dewater, the valve 75, may be a simple 'flap' or similarly-functioning structure, may remain closed at the beginning of operation. Once the biosolids thicken to a desired degree of dewatering, the valve 75, or flap may be opened and the system may operate continuously to produce dewatered biosolids as the dewatered "plug" moves through the system, driven by the pressure from additional feed, above.

Filtrate outlets 80 are fluidly connected to the drain spaces 90 from the anode and cathode compartments 27 and 29. The drains are routed to the level of the upper portion 20 of the device to allow filtrate to remain in the interstitial space 90, thus provide conductivity between the anode 30 and cathode 40 through the sludge.

In operation in the present system and process, chlorine dioxide may function as a flocculant. The resulting biosolids liquid exhibits a substantial increase in settlability and forms very small floc which allows water to pass freely through a filter material or textile membrane while retaining solids. The chlorine dioxide also modifies the conductivity of the biosolids to facilitate electro-osmotic flow. Electro-osmosis is the primary factor in electrokinetic dewatering and occurs when an electric field is applied to a sludge segment via electrodes. The net charge in the electrical double layer is induced to move by the resulting Coulomb force. The resulting flow is termed electro-osmotic flow, and is defined by the following formula:

$$\frac{dV}{dt} = \frac{\varepsilon_o \varepsilon_r \zeta}{\eta} EA$$

Where:
V: water volume (m3)
t; time (s)
$\varepsilon_o$: dielectric permittivity of vacuum (8.854×10−12 CV−1m−1)
$\varepsilon_r$: dielectric constant of the liquid
$\zeta$: zeta potential of sludge (V)
E: electrical field strength across the plug (Vm−1)
A: cross-sectional area (m2)
$\eta$: viscosity of the liquid (kgm−1s−1)

The addition of chlorine dioxide increases the dielectric constant of the liquid, may increase the zeta potential of the sludge. Chlorine dioxide addition also reduces the sludge viscosity. These factors resulting from the addition of a single chemical additive result in a significant increase in the electro-osmotic flow.

Chlorine dioxide may be generated on-site to be used as a disinfectant for municipal sludge. Upon exposure to sufficient levels of chlorine dioxide for a sufficient period of time, the gross levels of bacteria in the wastewater biosolids stream are reduced to allowable levels for land application as Class B biosolids, with fecal coliform concentrations below $2 \times 10^6$ CPU or MPN/gram dry weight solids.

After being treated with chloride dioxide, in the present system and process, the pretreated liquid biosolids are introduced to a device that allows for a current to be passed through the biosolids. The device provides for current to pass from an anode to a cathode using the filtrate as a means of conductance between the electrodes and the sludge to be dewatered. This method prevents the sludge at the anode from becoming dry, reducing the electrical contact and causing an increase in resistance.

The primary obstacles to utilizing electrokinetic dewatering for municipal sludge are the time/space required for the operation as a batch process, the low conductivity of municipal sludge (which requires increased current to effect dewatering) and the relatively low throughput of existing electrokinetic dewatering processes. The methods and devices currently disclosed overcome these obstacles. The use of chlorine dioxide improves the conductivity and facilitates electro-osmosis, reducing the energy required to operate the process. The separation and removal of free water from the partially flocked biosolids, while using the filtrate as a means of conductance between the anode and cathode, markedly improves the efficiency of the process.

Continuous operation of the process allows for controlling the degree of water removal by varying the rate of solids discharge from the device. This is accomplished without the complexity of other mechanical dewatering devices, such as a belt filter-press.

Chlorine dioxide alone, when added to municipal sludge to produce biosolids, results in an increase in flocculation. This increase in flocculation is substantial enough to allow for mild floc to form in the biosolids, allowing for the release of free water under controlled conditions. The mechanical design provides these conditions and allows for the removal of free water without the addition of polymer, while at the same time providing a means of conductance between the anode and cathode.

The addition of pressure, even as low as 2.5 kPa, provides an increase in the volume of biosolids that can be processed by the system due to increased volume of water removed from the partially flocked sludge and the improved field strength. A small amount of pressure applied to the system results in a higher current density and therefore more efficient operation.

The mechanical design includes a method of securing a conductive material, such as graphite to a circular supporting surface (pipe) in a manner that allow for the pressurization of the device without deformation of the graphite material (cracking). In this manner, graphite can be used as both the anode and cathode, increasing the efficiency of the unit.

Since the zeta potential of untreated sludge is usually negative, the direction of electro-osmotic flow is from the anode to the cathode (sludge particles move towards the anode). As the electro-osmotic flow moves from the anode to the cathode a moisture gradient increases inside the filter cake. Thus, large unsaturated pores appear at the anode side while a compact moist cake is formed at the cathode. The negative charge at the cathode repels negatively charged sludge particles, preventing clogging of the filter material and allowing for the more rapid removal of filtrate especially in the upper portion of the device where the cake density is lower. Chlorine dioxide pre-treatment, however, imparts a neutral or slightly positive zeta potential to the sludge. This allows for more equal flow in both directions, substantially increasing the speed at which the material dewaters.

Electrical conductivity has an effect on electrokinetic dewatering performance Low conductivity (e.g., a single digit conductivity measurement) is usually noted in secondary municipal sludges. The addition of chlorine dioxide can increase the electrical conductivity of waste activated sludge. Testing at a chlorine dioxide dose rate of 75 mg/L results in conductivity of 490 μS cm$^{-1}$. If the conductivity is too high, this can cause a reduction of the electrical double layer of the particles and the zeta potential of particles, and therefore a reduction of electro-osmosis. This negative effect, however, has been noted to occur usually at conductivities above that produced through the addition of chlorine dioxide to the biosolids. The function and advantages of these and other embodiments will be more fully understood from the following non-limiting example. The example is intended to be illustrative in nature and is not to be considered as limiting the scope of the embodiments discussed herein.

Example

To determine the effectiveness of the above-described process, an experimental apparatus was arranged to quantify the removal rate of filtrate from a source of pretreated biosolids. A two-foot long device was created as depicted in FIGS. 1 and 2. The first (inner) electrode was constructed of a graphite rod. The second electrode was a 6" diameter graphite pipe. The first electrode was wrapped in a woven plastic mesh, then enclosed in a textile membrane to allow water to pass from the sludge, through the filtrate, and to the anode. The second electrode was placed inside a 24" section of PVC pipe, and epoxied into place. Woven plastic mesh material was wrapped inside the second electrode to form a drain space for filtrate to collect, and a textile membrane was wrapped inside the textile membrane. Secondary biosolids treated with chlorine dioxide were added to the upper section of the device, and a voltage of 24 V and a current of 3 A were applied to the device from a power source. The current used in testing was continuous, but may be pulsed. The upper portion of the device was a three-foot long clear PVC pipe to allow sludge to settle and floc to form prior to introduction into the lower portion of the device containing the filter material and electrodes. The upper portion had a diameter of four inches. The lower portion had a diameter of six inches.

The pretreated biosolids feed comprised 75 ppm chlorine dioxide and had a total solids composition of 0.5% to 1.2%. The head pressure from the upper portion was approximately 1.3 psi-2.17 psi., depending on the height to which the column was filled. A filtrate removal rate of 0.23 gallons per minute (gpm), or 360 gallons per day (gpd), was observed. Table 1, shows the rate of thickening of the mixture, beginning with a solids fraction of 1% at start and achieving 6.48% solids after six minutes.

TABLE 1

| Minutes | % Total Solids |
|---|---|
| 0 | 1.00 |
| 1 | 1.16 |
| 2 | 1.39 |
| 3 | 1.73 |
| 4 | 2.29 |
| 5 | 3.39 |
| 6 | 6.48 |

Table 1 shows that the disclosed device is capable of achieving thickened biosolids.

Prophetic Example

The values obtained in the above-described Example were extrapolated to the scale of a full size water treatment plant, to determine the economic feasibility of the process and device. A filtrate removal rate of 0.23 gallons per minute (gpm) or 360 gallons per day (gpd) was observed as described in the Example above. These numbers are scaled to the typical operation of a water treatment plant. For a flow rate of a million gallons per day (mgd), a plant (assuming a typical 2% waste rate) must waste about 13 gpm, or 18,720 gpd. This waste flow is generally about 1% total solids (ts). Therefore, to meet this scale, approximately 52 of the test two-foot devices would be required. Alternatively, 10 ten-foot tall devices could be used thicken to ~6% (per mgd) prior to feed to an anaerobic digester. The footprint for ten devices would be approximately 18"×36".

TABLE 2

| Energy Calculator | | |
|---|---|---|
| Voltage | Volts | 24 |
| Current | Amps | 3 |
| Time | hrs | 24 |
| Energy | kWh | 1.728 |
| Energy Cost | $/kWh | $ 0.11 |
| Total Energy Cost | $ | $ 0.19008 |
| Total Cost | | $ 9.88 |

The operating cost of a two foot device is calculated in Table 2 to achieve thickening to about 6% biosolids. For the 24" test unit running 24 hrs/day, an electrical cost of S0.19 is incurred. S0.19 multiplied by 52 devices equals S9.88 per mgd for thickening, which is substantially less than typical polymer cost alone in a traditional method. Assuming 10 lbs/dry ton for thickening, would be around S12/mgd in polymer costs.

This prophetic example demonstrates the economic feasibility of using the disclosed method and device scaled to the requirements of a water treatment plant.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

The invention claimed is:

1. A method for separating water from biosolids, the method comprising:
   treating a sludge or biosolids with chlorine dioxide to form a pretreated bio solids; and
   subjecting the pretreated biosolids to electro-osmosis to separate water from the pretreated biosolids in an electrokinetic dewatering or thickening device including:
      a first electrode compartment having a first electrode surrounded by filter material, the first electrode and filter material defining a filtrate drain space between the first electrode and the filter material; and
      a second electrode compartment having a second electrode, the second electrode compartment spaced apart from and surrounding the first compartment,
   subjecting the pretreated biosolids to electro-osmosis including applying a voltage across the first and second electrodes that causes water to flow from the sludge or biosolids through the filter material and into the filtrate drain space, and then out of the device through a filtrate outlet in fluid communication with the filtrate drain space.

2. The method of claim 1, wherein treating the sludge or biosolids with chlorine dioxide to form a pretreated biosolids results in a Class B pretreated biosolids.

3. An electrokinetic dewatering or thickening device, comprising:
   an upper portion, including:
      an inlet to receive pretreated biosolids;
      a conduit extending from the inlet;
   a lower portion positioned below the upper portion, the lower portion including:
      a first electrode compartment having a first electrode surrounded by filter material, the first electrode and filter material defining a first filtrate drain space between the first electrode and the filter material; and
      a second electrode compartment having a second electrode distal to the filter material, the second electrode and filter material defining a second filtrate drain space between the second electrode and the filter material, the second electrode compartment spaced apart from and surrounding the first compartment;
   a dewatered or thickened pretreated biosolids outlet positioned below the lower portion; and
   a filtrate outlet fluidly connected to at least one of the first drain space and the second drain space.

4. The device of claim 3, further comprising an outer wall connected to at least one of the first electrode and the second electrode.

5. The device of claim 4, wherein the outer wall is made of a non-conductive material.

6. The device of claim 5, wherein the outer wall is made of PVC.

7. The device of claim 3, wherein the first electrode and the second electrode are made of graphite, conductive carbon fiber, or a combination of both.

8. The device of claim 3, further comprising a power supply connected to the first electrode and the second electrode.

9. A waste treatment system comprising:
   a source of municipal sludge or biosolids;
   a chlorine dioxide treatment unit fluidly connected downstream of the source of municipal sludge or biosolids and configured to introduce chlorine dioxide into the municipal sludge to produce pretreated biosolids; and
   an electrokinetic dewatering or thickening device positioned downstream of the chlorine dioxide treatment unit, the electrokinetic dewatering or thickening device comprising:
      first and second electrode compartments, the first electrode compartment having a first electrode surrounded by filter material, the first electrode and filter material defining a first filtrate drain space between the first electrode and the filter material, the second electrode compartment spaced apart from and surrounding the first compartment; and
      a dewatered or thickened pretreated biosolids outlet positioned below the first and second electrode compartments.

10. The waste treatment system of claim 9, wherein the electrokinetic dewatering or thickening device further comprises an inlet to receive the pretreated biosolids.

11. The waste treatment system of claim 9, wherein the second electrode compartment comprises a second electrode proximate the filter material.

12. The waste treatment system of claim 11, wherein the second electrode and the filter material define a second filtrate drain space.

13. The waste treatment system of claim 12, wherein the electrokinetic dewatering or thickening device further comprises a filtrate outlet connected to at least one of the first filtrate drain space and the second filtrate drain space.

* * * * *